(12) United States Patent
Kanai et al.

(10) Patent No.: US 7,778,517 B2
(45) Date of Patent: Aug. 17, 2010

(54) INFORMATION RECORDING DEVICE, INFORMATION REPRODUCTION DEVICE, INFORMATION RECORDING METHOD, INFORMATION REPRODUCTION METHOD, INFORMATION RECORDING PROGRAM, INFORMATION REPRODUCTION PROGRAM, AND INFORMATION RECORDING MEDIUM

(75) Inventors: Yuichi Kanai, Moriguchi (JP); Yoshihiro Hori, Moriguchi (JP); Ryoji Ohno, Osaka (JP); Takeo Ohishi, Yokohama (JP); Kenichiro Tada, Tokorozawa (JP); Tatsuya Hirai, Kawasaki (JP)

(73) Assignees: Sanyo Electric Co., Ltd., Moriguchi-shi, Osaka (JP); Sharp Corporation, Osaka-shi, Osaka (JP); Victor Company of Japan, Limited, Yokohama-shi, Kanagawa (JP); Pioneer Corporation, Tokyo (JP); Hitachi, Ltd., Tokyo (JP)

( * ) Notice: Subject to any disclaimer, the term of this patent is extended or adjusted under 35 U.S.C. 154(b) by 1248 days.

(21) Appl. No.: 10/506,527

(22) PCT Filed: Mar. 4, 2003

(86) PCT No.: PCT/JP03/02507

§ 371 (c)(1),
(2), (4) Date: Sep. 3, 2004

(87) PCT Pub. No.: WO03/075567

PCT Pub. Date: Sep. 12, 2003

(65) Prior Publication Data

US 2005/0111278 A1 May 26, 2005

(30) Foreign Application Priority Data

Mar. 5, 2002 (JP) .............................. 2002-107156
Nov. 12, 2002 (JP) .............................. 2002-328061

(51) Int. Cl.
*H04N 5/91* (2006.01)
*H04N 5/00* (2006.01)

(52) U.S. Cl. .......................................... 386/46; 386/125
(58) Field of Classification Search .................... 386/46
See application file for complete search history.

(56) References Cited

U.S. PATENT DOCUMENTS 6,128,434 A * 10/2000 Hirayama et al. ............. 386/97
2002/0003815 A1 * 1/2002 Hisamatsu et al. ........... 370/535
2002/0194603 A1 * 12/2002 Connelly ....................... 725/46

FOREIGN PATENT DOCUMENTS

| JP | 2000-268537 | 9/2000 |
| JP | 2001-218143 | 8/2001 |
| JP | 2001-352517 | 12/2001 |
| JP | 2002-016843 | 1/2002 |
| JP | 2002-051296 | 2/2002 |
| JP | 2002-335477 | 11/2002 |

* cited by examiner

*Primary Examiner*—Marsha D Banks Harold
*Assistant Examiner*—Oluwaseun A Adegeye
(74) *Attorney, Agent, or Firm*—Drinker Biddle & Reath LLP

(57) ABSTRACT

An information recording apparatus is provided whereby in the reproduction of broadcasting information, the broadcasting information can be recorded so that the combination and so on of contents included in the broadcasting information can be recognized without the need for reproducing the broadcasting information itself.

An information recording apparatus for recording broadcasting information constituted of a packet which has a predetermined amount of information and includes different types of contents, each type including one or more contents, the apparatus including a controller 8. The controller 8 generates contents group information based on correlation information which is included in the received broadcasting information and indicates a correlation between the contents, the contents group information including identification information for identifying the relationship between the packet and the content and type information indicating the type of the content, the contents group information indicating a contents group to include the one or more contents, and the controller 8 records the generated contents group information on a hard disk 1 with the broadcasting information.

11 Claims, 12 Drawing Sheets

INFORMATION RECORDING DEVICE, INFORMATION REPRODUCTION DEVICE, INFORMATION RECORDING METHOD, INFORMATION REPRODUCTION METHOD, INFORMATION RECORDING PROGRAM, INFORMATION REPRODUCTION PROGRAM, AND INFORMATION RECORDING MEDIUM

TECHNICAL FIELD

The present invention relates to a technical field of an information recording apparatus, an information reproducing apparatus, an information recording method, an information reproducing method, an information recording program, an information reproducing program, and an information recording medium and specifically relates to an information recording apparatus for recording, on a recording medium, broadcasting information distributed via a network or broadcasting, an information recording method, an information recording program, and an information recording medium for recording the information recording program, an information reproducing apparatus for reproducing the recorded broadcasting information from the recording medium, an information reproducing method, an information reproducing program, and an information recording medium for recording the information reproducing program.

BACKGROUND ART

In recent years so-called BS (Broadcasting Satellite) digital broadcasting has been started and it has become easy to obtain high quality digital images and so on.

Conventionally so-called Hi-Vision recorders record broadcasting information as it is, which includes two or more types of contents (generally also referred to as an elementary stream) outputted from BS digital tuners.

However, the conventional recorders are not devised in consideration of the fact that a contents group constituted of two or more contents or two or more types of contents is broadcasted.

Further, in the conventional recorders, it is necessary to search for management information, which is recorded as a part of broadcasting information, to refer to the recorded contents such as the attribute of a content. For example, when contents including management information are all encrypted, it is necessary to perform decryption before reaching the management information of the contents, thereby reducing convenience of the user.

DISCLOSURE OF INVENTION

The present invention is devised in view of this problem. An object of the present invention is to provide an information recording apparatus which can record broadcasting information and so on in such a manner as to recognize, in the reproduction of the broadcasting information, a combination and so on of contents included in the broadcasting information without the need for reproducing the broadcasting information itself, an information recording method, an information recording program, an information recording medium for recording the information recording program, an information reproducing apparatus for reproducing the recorded broadcasting information from the recording medium, an information reproducing method, an information reproducing program, and an information recording medium for recording the information reproducing program.

In order to solve the problem, a first invention provides an information recording apparatus for recording broadcasting information such as Transport stream on a recording medium, the broadcasting information includes one or more contents, types of the contents are different from each other, and is constituted of unit information (TS-Packet) which has a predetermined amount of information and correlation information which indicates a correlation between the contents, the apparatus comprising: a generating device for generating contents group information (CGIFn) based on the correlation information, the contents group information including identification information (PID) for identifying a relationship between the unit information and the content and type information (CTY) indicating a type of the content, the contents group information indicating a contents group including the contents, and a recording device for recording the generated contents group information on the recording medium with the broadcasting information.

According to the first invention, since the contents group information is recorded separately from the broadcasting information, when the broadcasting information is reproduced, it is possible to recognize a combination and so on of contents included in the broadcasting information without the need for reproducing the broadcasting information itself.

In a preferred first embodiment of the first invention, according to the information recording apparatus of the first invention, the broadcasting information is broadcasted by BS digital broadcasting and the correlation information is descriptors broadcasted by BS digital broadcasting.

According to the embodiment, the content information is generated based on the descriptors included in the broadcasting information broadcasted by BS digital broadcasting, thereby correctly generating the information with ease.

In order to solve the problem, a second invention provides an information reproducing apparatus for reproducing the broadcasting information from the recording medium on which the contents group information is recorded with the broadcasting information by the information recording apparatus of claim 1 or 2, the reproducing apparatus comprising: a selecting device such as an operation part which selects a content to be reproduced before the broadcasting information is reproduced, and a generating device such as an OSD (On Screen Display) generating part which generates a display signal for displaying the contents of the contents group information corresponding to the contents group including the selected content.

According to the second invention, the contents group information is recorded separately from the broadcasting information and the contents of the contents group information are displayed before the broadcasting information is reproduced. Thus, it is possible to recognize the combination and so on of contents included in the broadcasting information without the need for reproducing the broadcasting information itself.

In order to solve the problem, a third invention provides an information recording method for recording broadcasting information such as Transport stream on a recording medium, the broadcasting information includes one or more contents, types of the contents are different from each other, and is constituted of unit information (TS-Packet) which has a predetermined amount of information and correlation information which indicates a correlation between the contents, the method comprising: a generating process of generating contents group information based on the correlation information, the contents group information including identification information for identifying a relationship between the unit information and the content and type information indicating a type of the content, the contents group information indicating a contents group including the contents, and a recording process of recording the generated contents group information on the recording medium with the broadcasting information.

According to the third invention, the contents group information is recorded separately from the broadcasting information. Thus, it is possible to recognize the combination and so on of contents included in the broadcasting information without the need for reproducing the broadcasting information itself.

In a preferred first embodiment of the third invention, according to the information recording method of the third invention, the broadcasting information is broadcasted by BS digital broadcasting and the correlation information is descriptors broadcasted by BS digital broadcasting.

According to the embodiment, the contents group information is generated based on the descriptors included in the broadcasting information broadcasted by BS digital broadcasting. Thus, it is possible to accurately generate the information with ease.

In order to solve the problem, a forth invention provides an information reproducing method for reproducing the broadcasting information from the recording medium on which the contents group information is recorded with the broadcasting information by the information recording method of claim 4 or 5, the reproducing method comprising: a selecting process of selecting a content to be reproduced before the broadcasting information is reproduced, and a generating process of generating a display signal for displaying the contents of the contents group information corresponding to the contents group including the selected content.

According to the forth invention, the contents group information is recorded separately from the broadcasting information and the contents of the contents group information are displayed before the broadcasting information is reproduced. Thus, it is possible to recognize the combination and so on of contents included in the broadcasting information without the need for reproducing the broadcasting information itself.

In order to solve the problem, the fifth invention causes a recording computer to function as a generating device and a recording device, the recording computer being included in an information recording apparatus for recording broadcasting information such as Transport stream on a recording medium, the broadcasting information includes one or more contents, types of the contents are different from each other, and is constituted of unit information (TS-Packet) which has a predetermined amount of information and correlation information which indicates a correlation between the contents, the generating device for generating contents group information (CGIFn) based on the correlation information, the contents group information including identification information (PID) for identifying a relationship between the unit information and the content and type information (CTY) indicating a type of the content, the contents group information indicating a contents group including the contents, the recording device for recording the generated contents group information on the recording medium with the broadcasting information.

According to the fifth invention, the recording computer functions in such a manner as to record the contents group information separately from the broadcasting information. Thus, when the broadcasting information is reproduced, it is possible to recognize the combination and so on of contents included in the broadcasting information without the need for reproducing the broadcasting information itself.

In a preferred first embodiment of the fifth invention, according to the information recording program of the fifth invention, the broadcasting information is broadcasted by BS digital broadcasting and the correlation information is descriptors broadcasted by BS digital broadcasting.

According to the embodiment, the recording computer functions in such a manner as to generate the contents group information based on the descriptors included in the broadcasting information broadcasted by BS digital broadcasting. Thus, it is possible to correctly generate the information with ease.

In order to solve the problem, the sixth invention causes a reproducing computer to function as a selecting device and a generating device, the reproducing computer being included in the information reproducing apparatus for reproducing the broadcasting information from the recording medium on which the contents group information is recorded with the broadcasting information by the information recording apparatus of claim 1 or 2, the selecting device selecting a content to be reproduced before the broadcasting information is reproduced, the generating device generating a display signal for displaying the contents of the contents group information corresponding to the contents group including the selected content.

According to the sixth invention, the contents group information is recorded separately from the broadcasting information and the reproducing computer functions in such a manner as to display the contents of the contents group information before the broadcasting information is reproduced. Thus, it is possible to recognize the combination and so on of contents included in the broadcasting information without the need for reproducing the broadcasting information itself.

In order to solve the problem, in the seventh invention, the information recording program according to the fifth invention is recorded so as to be read by the recording computer.

When the program for recorded information according to the fifth invention is recorded, the program is read and executed by the recording computer, so that the recording computer functions in such a manner as to record the contents group information separately from the broadcasting information. Thus, when the broadcasting information is reproduced, it is possible to recognize the combination and so on of contents included in the broadcasting information without the need for reproducing the broadcasting information itself.

When the program for recorded information according to the preferred first embodiment of the fifth invention is recorded, the program is read and executed by the recording computer, so that the recording computer functions in such a manner as to generate the contents group information based on the descriptors included in the broadcasting information on BS digital broadcasting. Thus, it is possible to correctly generate the information with ease.

In order to solve the problem, in the eighth invention, the information reproducing program according to the sixth invention is recorded so as to be read by the reproducing computer.

The program is read and executed by the reproducing computer, so that the contents group information is recorded separately from the broadcasting information and the reproducing computer functions in such a manner as to display the contents of the contents group information before the broadcasting information is reproduced. Thus, it is possible to recognize the combination and so on of contents included in the broadcasting information without the need for reproducing the broadcasting information itself.

BEST MODE FOR CARRYING OUT THE INVENTION

Figure 1:
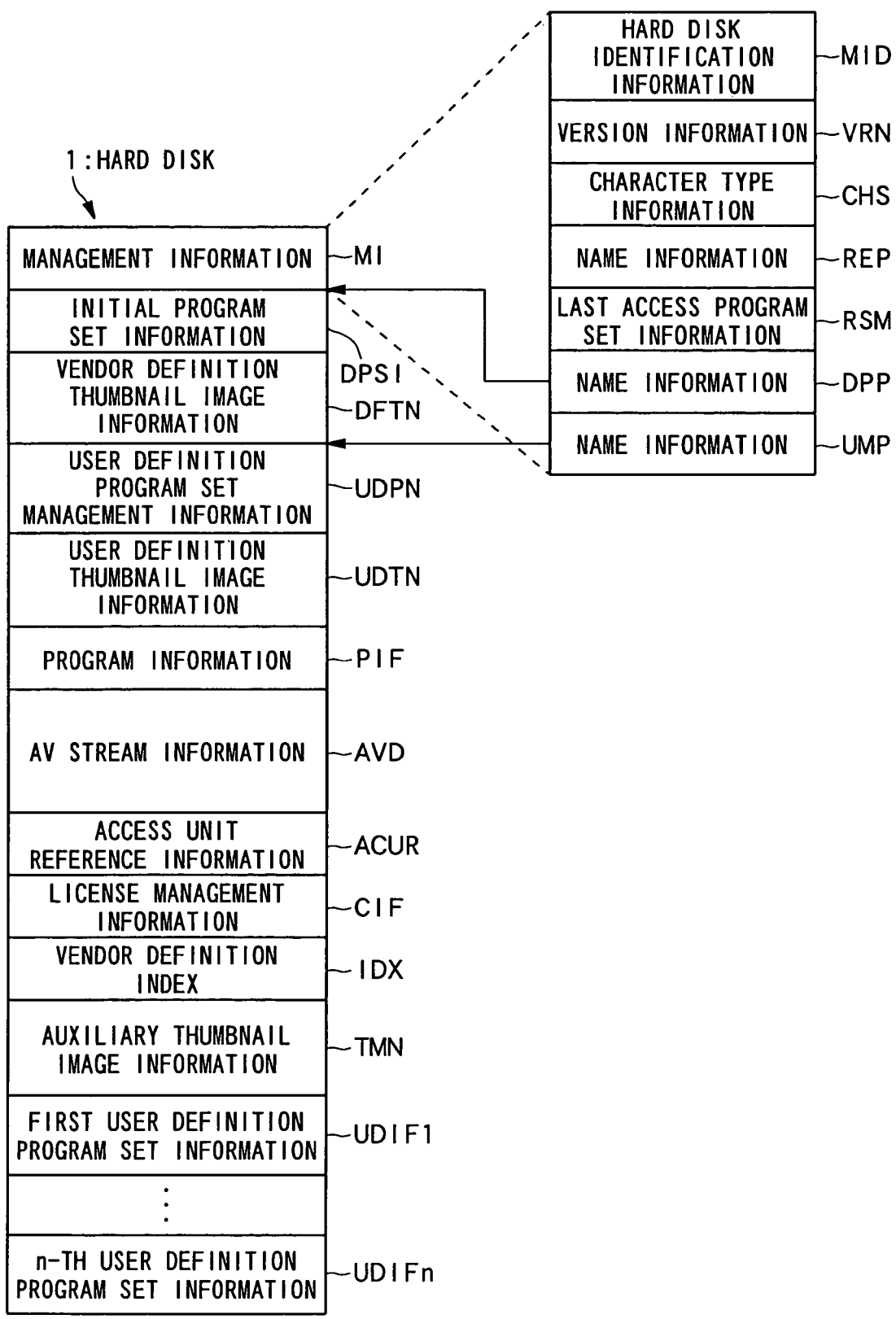
FIG. 1 is a diagram (I) for explaining a recording format of an embodiment.

Preferred embodiments of the present invention will be described below in accordance with the accompanying drawings.

In the following embodiments, the present invention is applied to an information recording apparatus which can record, on a portable hard disk, AV (Audio Visual) information (including music information or image information) distributed via a network such as the Internet, and edit the recorded AV information, the hard disk being processed for copyright protection.

In the following explanation, the AV information is distributed according to the transport stream standard of MPEG (Moving Picture Experts Group) 2, which is a known standard of a moving image compression technique.

(I) Embodiment of a Recording Format

First, prior to a specific explanation about the information recording apparatus of the present embodiment, the following will describe the outline of a logical recording format which is used when the information recording apparatus records the AV information on the hard disk in accordance with FIGS. 1 to 7. FIGS. 1 to 7 schematically show the recording format in a hierarchical manner after the AV information is recorded on the hard disk based on the recording format.

The recording format shown in FIGS. 1 to 7 is a logical recording format used for recording the AV information of the present embodiment on the hard disk. As to the physical recording format used for recording, a known physical format in the hard disk is used as it is.

First, the following will describe the outline of various concepts which are used in the recording format to efficiently manage the contents and recording format of the recorded AV information.

First, in the recording format below, a concept "program" is used as a unit for handling recorded AV information. That is, a program represents one piece of AV information continuously recorded on the hard disk.

When distributed AV information is analog information, for example, when one television program is continuously recorded, the television program acts as a "program." When only a part of the program is continuously recorded, only the continuously recorded part acts as a "program." When a plurality of television programs are continuously recorded at same time, the continuously recorded television programs act as one "program." Meanwhile, when the AV information is digital information, for example, when the AV information is distributed via BS (Broadcast Satellite) digital broadcasting, one event of BS digital broadcasting is defined as a "program."

Second, in the recording format below, a concept "program list" is used to enable the user (user who watches recorded AV information) to freely edit recorded AV information and logically create a new program. That is, the program list is a set of pieces of instruction information (generally also referred to as pointers) used for specifying one program or a part of the program to make a distinction from other programs or other parts. A representative image (hereinafter referred to as a thumbnail image), which represents the contents of AV information included in the program list, can be defined for each program list.

Therefore, for example, when the user performs edits so as to successively reproduce a part of one recorded program and a part of another recorded program in this order, the user combines instruction information indicating the part of the program and instruction information indicating the part of the another program so as to reproduce the instruction information in this order, so that one program list is created. The concept of the program list makes it possible to reproduce AV information in a reproduced form desired by the user without changing the original recording order and so on of the AV information having been recorded on the hard disk.

The following program lists are defined: a program list set by the user who refers to recorded AV information in the above manner (user definition program list), and a program list set in advance by a provider (vendor) who distributes AV information to be recorded (vendor definition program list).

Further, the following thumbnail images are defined: a vendor definition thumbnail image which is set in advance by the vendor and distributed with AV information, and a user definition thumbnail image which is additionally set by the user after distributed AV information is recorded on the hard disk.

Third, in the recording format below, a concept "program set" is used as a set including two or more user definition program lists or vendor definition program lists created based on a reproduced form desired by the user (to be specific, the reproducing order specified by the user for each AV information). The following program sets are defined: an initial program set used for reproducing, in the original recording order, AV information (program) first recorded on the hard disk (a program list included in the initial program set is the vendor definition program list), and a user definition program set including the user definition program list.

Fourth, in the recording format below, a concept "index" is used as a kind of the instruction information. That is, the index is instruction information for specifying one program or a part of the program to make a distinction from other programs or other parts, and the index is provided for enabling the user to facilitate handling of AV information. The following indexes are defined: a vendor definition index which is set in advance by the vendor before distribution, and a user definition index which is additionally set by the user after distributed AV information is recorded on the hard disk. The vendor definition index is distributed as an index file along with AV information, whereas the user definition index is represented as the program list.

The logical recording format of the present embodiment will be discussed below based on the above described various concepts.

As shown in FIG. 1, on a hard disk 1 where necessary AV information has been recorded, the following information is recorded: management information MI which is management information on an overall program recorded on the hard disk 1 and is first referred in the reproduction of recorded AV information, initial program set information DPSI which is management information on the initial program set, vendor definition thumbnail image information DFTN in which image information corresponding to the vendor definition thumbnail image is identified by the name of the image information, user program set management information UDPM which is management information on the user definition program set, user definition thumbnail image information UDTN in which image information corresponding to the user definition thumbnail image is identified by the name of the image information, program information PIF which is management information corresponding to the programs, AV stream information AVD which is an entity of AV information distributed and recorded on the hard disk 1, access unit reference information ACUR which includes, for each access unit, address information and information indicating a total a mount of information of one I picture (Intra-coded Picture) in one access unit, the address information indicating the recording position of the I picture on the hard disk 1 in one access unit, which is constituted of image information corresponding to the I picture included in the AV information, license management information CIF for managing a license status of recorded AV information, a vendor definition index IDX, auxiliary thumbnail image information TMN corresponding to an auxiliary image which is used as a thumbnail image but is neither the vendor definition thumbnail image nor the user definition thumbnail image, and user definition program set information UDIF1 to UDIFn serving as management information on the user definition program sets which are defined after AV information is recorded on the hard disk 1 (FIG. 1 has n sets of user definition programs).

As shown in FIG. 1, the management information MI is constituted of hard disk identification information MID (12 bytes) for identifying the hard disk 1 from other hard disks, version information VRN (2 bytes) indicating the version of the hard disk 1, character type information CHS (2 bytes) indicating a character type (attribute) included in recorded AV information, name information REP (128 bytes) indicating a name when the hard disk 1 has a name, a last access program set number RSM which is the number of the last program set reproduced at the completion of the reproduction of AV information recorded on the hard disk 1, name information DPP describing a file name of the initial program set information DPSI (i.e., a so-called path name which specifically indicates the name "initial program set information DPSI"), and name information UMP describing a file name of the user program set management information UDPM (similarly referred to as a path name which specifically indicates the name "user definition program set management information UDPM").

Figure 2:
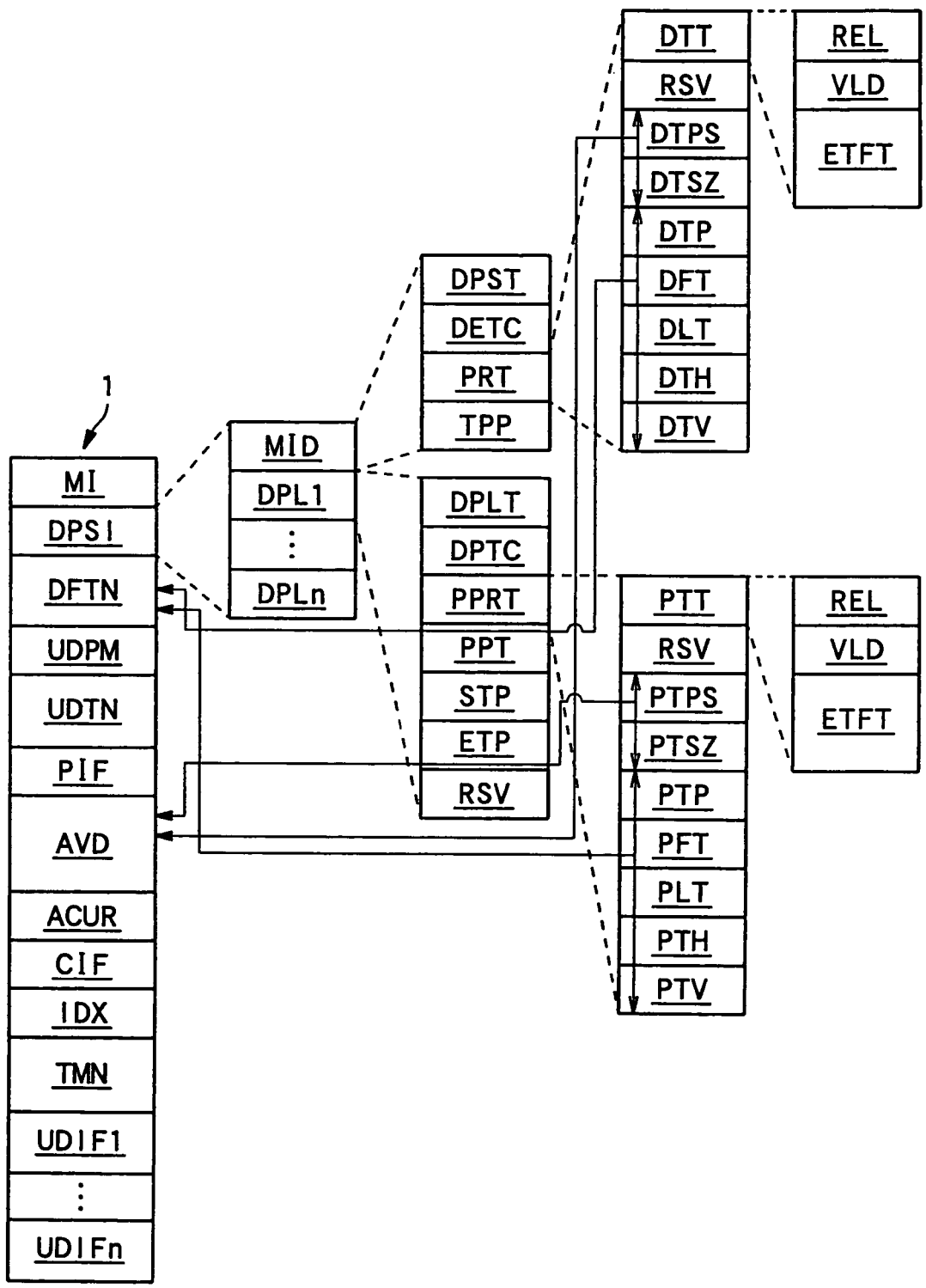
FIG. 2 is a diagram (II) for explaining the recording format of the embodiment.

Referring to FIG. 2, the detailed configuration of the initial program set information DPSI will be described below.

As shown in FIG. 2, the initial program set information DPSI includes initial program set general information DPI which includes name information and so on indicating the name of the initial program set and pieces of vendor definition program list information DPL1 to DPLn which concern a plurality of vendor definition program lists included in the initial program set.

The initial program set general information DPI includes name information DPST (80 bytes) indicating the name of the initial program set, other information DETC (148 bytes) indicating other information of the initial program set general information DPI (including memo information and so on indicating the attribute and so on of the initial program set), initial program set representative image information PRT (156 bytes) on image information for a thumbnail image corresponding to the initial program set (also a thumbnail image representing the overall hard disk 1), and name information TPP (128 bytes) which describes the name of image information corresponding to the initial program set only when a thumbnail image specifier effective flag (described later) is effective.

The initial program set representative image information PRT includes attribute information DTT (1 byte) indicating the attribute of the initial program set representative image, auxiliary information RSV (3 bytes) which is insignificant information of the initial program set representative image information PRT, initial program set representative image recording position information DTPS (8 bytes) which describes the recording position (the recording position of the start of information serving as the I picture) of image information corresponding to the initial program set representative image on the hard disk 1 (in this case, only the I picture of recorded AV information corresponds to the image information) only when the thumbnail image specifier effective flag (described later) is effective, initial program set representative image information amount information DTSZ (4 bytes) which describes an amount of image information (the number of bytes) corresponding to the initial program set representative image only when the thumbnail image specifier effective flag (described later) is effective, name information DTP (128 bytes) describing the name of image information corresponding to the initial program set representative image, offset position information DFT (4 bytes) describing the position of image information corresponding to the initial program set representative image in the vendor definition thumbnail image information DFTN (to be specific, the number of offset bytes from the start of the vendor definition thumbnail image information DFTN), initial program set representative image information amount information DLT (4 bytes) describing an amount of image information (the number of bytes) corresponding to the initial program set representative image, horizontal information amount information DTH (2 bytes) which describes an amount of information in the horizontal direction of image information corresponding to the initial program set representative image stored as a file, and vertical information amount information DTV (2 bytes) which describes an amount of information in the vertical direction of image information corresponding to the initial program set representative image stored as a file.

To be specific, the initial program set representative image recording position information DTPS and the initial program set representative image information amount information DTSZ indicate the recording position and an amount of information of any one of static images included in the AV stream information AVD (the static image is used as the initial program set representative image). Meanwhile, the name information DTP, the offset position information DFT, the initial program set representative image information amount information DLT, the horizontal information amount information DTH, and the vertical information amount information DTV indicate static images which are recorded in the vendor definition thumbnail image information DFTN and are identified by name.

The attribute information DTT includes permission information REL indicating whether the reset of the initial program set representative image should be permitted or not, a thumbnail image specifier effective flag VLD indicating whether the specification of a static image is effective or not, which uses the initial program set representative image recording position information DTPS and the initial program set representative image information amount information DTSZ, and attribute information ETFT indicating the type (attribute) of image information corresponding to an image used as the initial program set representative image when the image is selected from image information other than distributed AV information. In this case, the permission information REL has a value "0" written to it when permitting the reset of the initial program set representative image. When the reset is not permitted, the permission information REL has a value "1" written to it. The thumbnail image specifier effective flag VLD has a value "1" written to it when the specification of a static image is effective, which uses the initial program set representative image recording position information DTPS and the initial program set representative image information amount information DTSZ. When the specification is ineffective, the thumbnail image specifier effective flag VLD has a value "0" written to it.

The vendor definition program list information DPL includes name information DPLT (80 bytes) indicating a name (can be changed by the user) of a vendor definition program list corresponding to the vendor definition program list information DPL, other information DPTC (108 bytes) which is other information (including memo information indicating the attribute and so on of the vendor definition program list) of the vendor definition program list information DPL, vendor definition program list representative image information PPRT (156 bytes) which concerns image information for a thumbnail image corresponding to the vendor definition program list, name information PPT (128 bytes) describing the name of program information (described later) corresponding to a program included in the vendor definition program list, start position information STP (8 bytes) describing the start position of recording a program on the hard disk 1, the program having access according to the vendor definition program list, end position information ETP (8 bytes) describing the end position of recording the program on the hard disk 1, the program having access according to the vendor definition program list, and auxiliary information RSV (4 bytes) which is insignificant information of the vendor definition program list information DPL.

The vendor definition program list representative image information PPRT includes attribute information PTT (1 byte) indicating the attribute of the vendor definition program list representative image, auxiliary information RSV (3 bytes) which is insignificant information of the vendor definition program list representative image information PPRT, vendor definition program list representative image recording position information PTPS (8 bytes) which describes the recording position (the recording position of the start of information serving as the I picture) of image information on the hard disk 1 (in this case, only the I picture of recorded AV information corresponds to the image information) only when the thumbnail image specifier effective flag (described later) is effective, the image information corresponding to the vendor definition program list representative image, vendor definition program list representative image information amount information PTSZ (4 bytes) which describes an amount (the number of bytes) of image information corresponding to the vendor definition program list representative image only when the thumbnail image specifier effective flag (described later) is effective, name information PTP (128 bytes) describing the name of image information corresponding to the vendor definition program list representative image, offset position information DFT (4 bytes) describing the position of image information, which corresponds to the vendor definition program list representative image, in the vendor definition thumbnail image information DFTN (to be specific, the number of offset bytes from the start of the vendor definition thumbnail image information DFTN), vendor definition program list representative image information amount information PLT (4 bytes) describing an amount (the number of bytes) of image information corresponding to the vendor definition program list representative image, horizontal information amount information PTH (2 bytes) which describes an amount of information in the horizontal direction of image information corresponding to the vendor definition program list representative image stored as a file, and vertical information amount information PTV (2 bytes) which describes an amount of information in the vertical direction of image information corresponding to the vendor definition program list representative image stored as a file.

The vendor definition program list representative image recording position information PTPS and the vendor definition program list representative image information amount information PTSZ specifically indicate the recording position and an amount of information of any one of static images included in the AV stream information AVD (the static image is used as the vendor definition program list representative image). Meanwhile, the name information PTP, the offset position information PFT, the vendor definition program list representative image information amount information PLT, the horizontal information amount information PTH, and the vertical information amount information PTV indicate static images which are recorded in the vendor definition thumbnail image information DFTN and are identified by name.

The attribute information PTT includes permission information REL indicating whether the reset of the vendor definition program list representative image should be permitted or not, a thumbnail image specifier effective flag VLD indicating whether the specification of a static image is effective or not, which uses the vendor definition program list representative image recording position information PTPS and the vendor definition program list representative image information amount information PTSZ, and attribute information ETFT indicating the type (attribute) of image information corresponding to an image used as the vendor definition program list representative image when the image is selected from image information other than distributed AV information. In this case, the permission information REL has a value "0" written to it when permitting the reset of the vendor definition program list representative image. When the reset is not permitted, the permission information REL has a value "1" written to it. The thumbnail image specifier effective flag VLD has a value "1" written to it when the specification of a static image is effective, which uses the vendor definition program list representative image recording position information PTPS and the vendor definition program list representative image information amount information PTSZ. When the specification is ineffective, the thumbnail image specifier effective flag VLD has a value "0" written to it.

Figure 3:
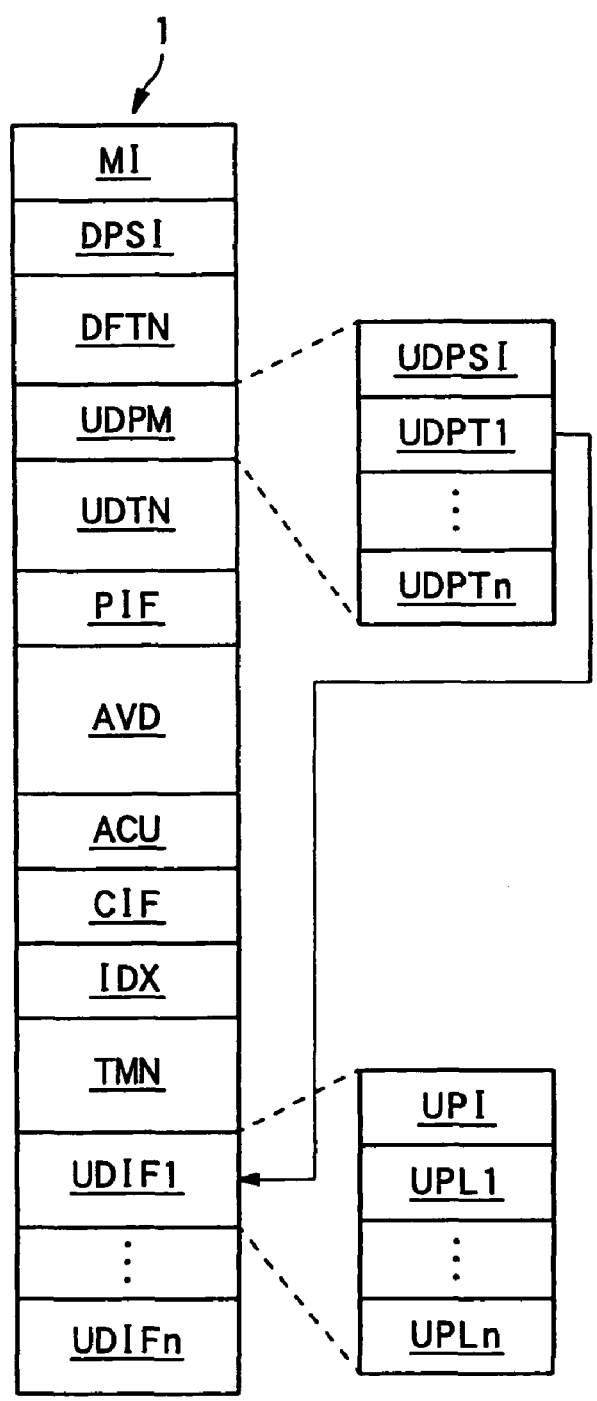
FIG. 3 is a diagram (III) for explaining the recording format of the embodiment.

Referring to FIG. 3, the detailed configuration of the user program set management information UDPM will be described below.

As shown in FIG. 3, the user program set management information UDPM includes user definition program set general information UDPSI which describes total information indicating a total number of the user definition program sets and name information UDPT1 to UDPTn which describe names "user definition program set information UDIF1 to UDIFn" (to be specific, e.g., the name "user definition program set information UDIF1") for each of the user definition program set information UDIF.

As shown in FIG. 3, the user definition program set information UDIF having a name indicated by the name information UDPT includes user definition program set general information UPI which includes name information and so on indicating the name of the user definition program set, and pieces of user definition program list information UPL1 to UPLn which concern a plurality of user definition program lists included in the user definition program set. The user definition program set general information UPI has a same hierarchical structure as the initial program set general information DPI described in FIG. 2. The user definition program list information UPL also has the same hierarchical structure as the vendor definition program list information DPL described in FIG. 2.

Figure 4:
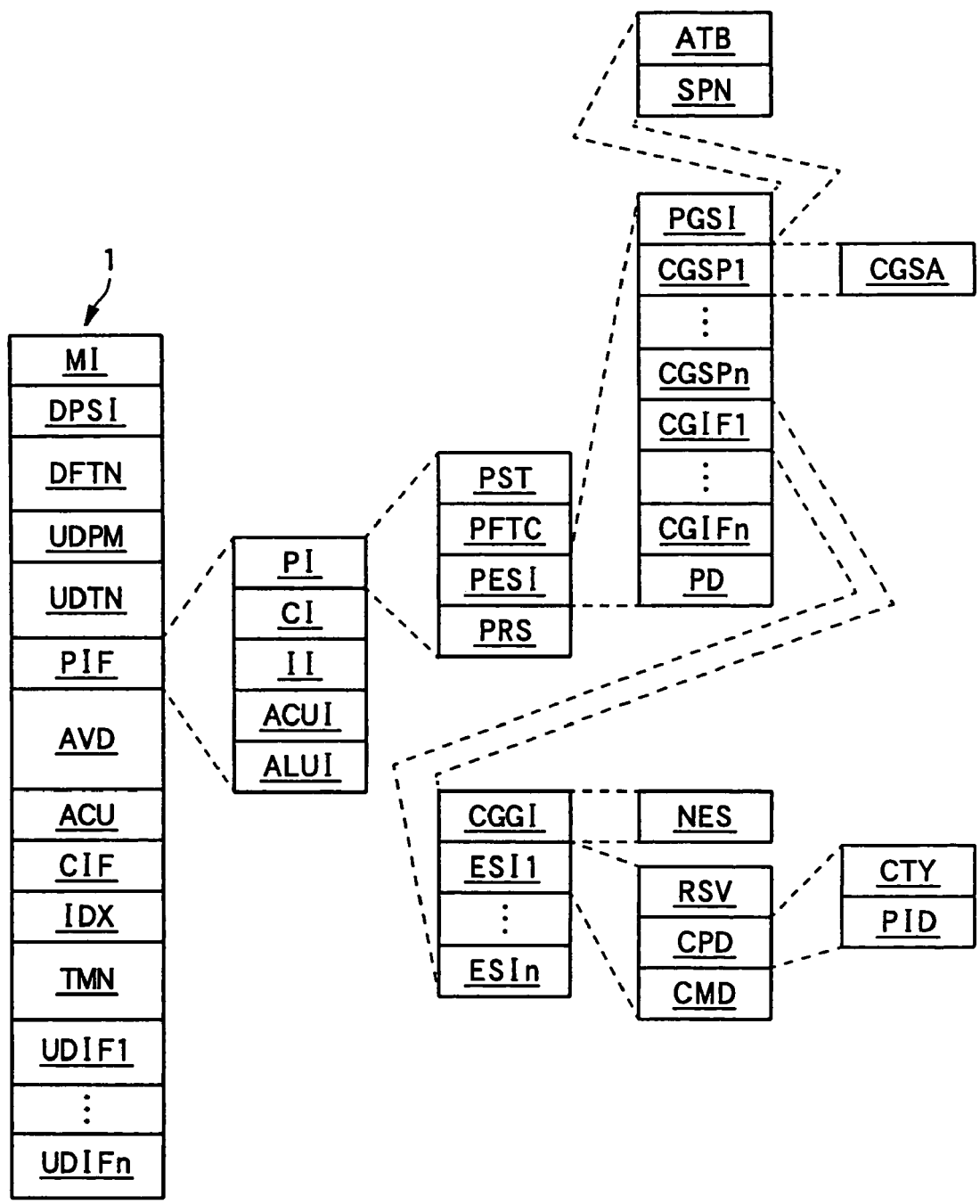
FIG. 4 is a diagram (IV) for explaining the recording format of the embodiment.
Figure 5:
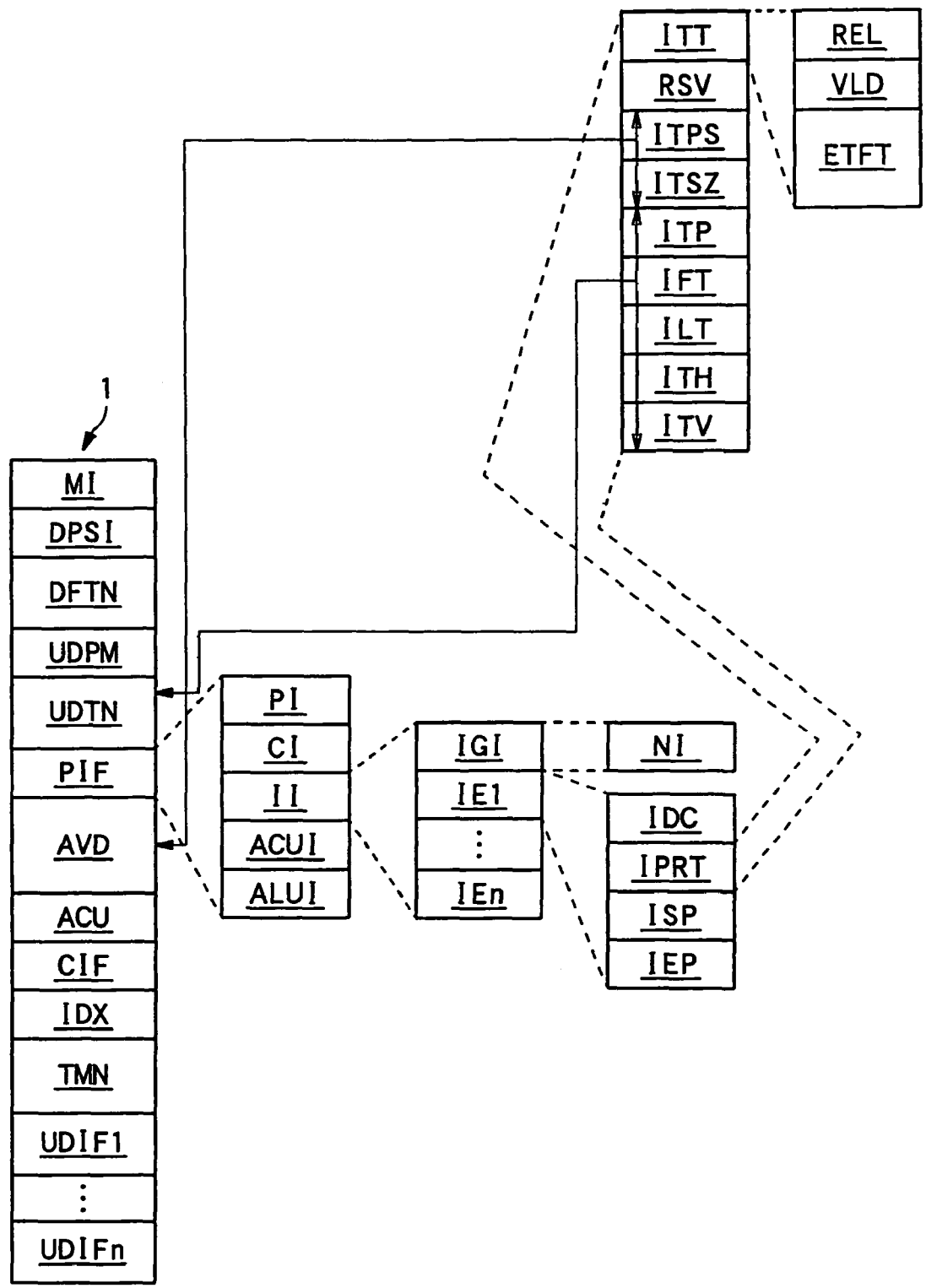
FIG. 5 is a diagram (V) for explaining the recording format of the embodiment.
Figure 6:
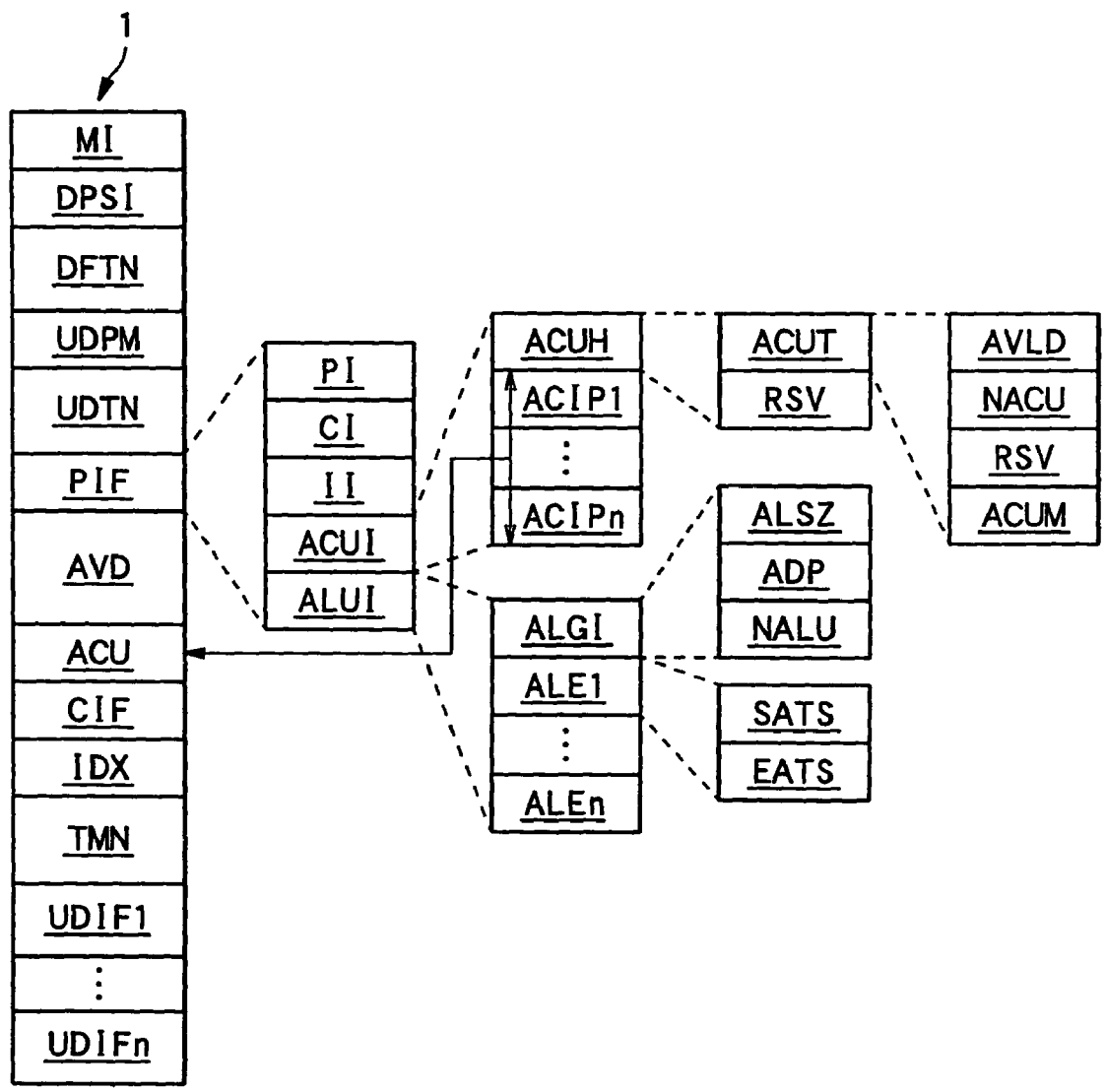
FIG. 6 is a diagram (VI) for explaining the recording format of the embodiment.

Referring to FIGS. 4 to 6, the detailed structure of the program information PIF will be described below.

First, as shown in FIG. 4, the program information PIF is constituted of program general information PI describing general information on a corresponding program, program license information CI describing information on a license corresponding to the program, index information II on an index where the program belongs, access unit information ACUI on an access unit included in the program, and allocation unit information ALUI on an allocation unit which includes a predetermined number of packets constituting a transport stream serving as a format during the distribution of the AV information.

The detailed configuration of the program general information PI will be described below.

As shown in FIG. 4, the program general information PI is constituted of program source information PST (1 byte) indicating the source of a program (whether the program is received via analog broadcasting or BS digital broadcasting), other information PFTC (143 bytes) indicating other information of the program general information PI, program content information PESI (104 bytes) which concerns contents constituting the program (i.e., image, sound, or data which is also generally referred to as an elementary stream), and program recording state information PRS which describes information indicating a recording format when the program is recorded on the hard disk 1.

The program content information PESI is constituted of program content general information PGSI which is general information of the program content information PESI, a plurality of contents group search pointers CGSP1 to CGSPn describing the recording positions of information on the hard disk 1, the information showing the contents of a plurality of distributed contents groups, the contents group being constituted of relevant contents (e.g., image information and sound information to be simultaneously reproduced) of a plurality of contents constituting the program, pieces of contents group information CGIF1 to CGIFn which specifically describe information showing the contents of the contents groups, and padding data PD for adjusting an amount of information of the overall program content information PESI.

The program content general information PGSI is constituted of attribute information ATB (1 byte) indicating the attribute of the program and pointer number information SPN (1 byte) indicating the number of contents group search pointers CGSP included in the program content information PESI.

Further, each of the contents group search pointers CGSP includes group information start address information CGSA (1 byte) which describes the recording positions of information showing the contents of corresponding contents groups, as address information relative to the position of recording the start of the program content information PESI on the hard disk 1.

Each piece of the contents group information CGIF is constituted of contents group general information CGGI and pieces of content information ESI1 to ESIn. The contents group general information CGGI is constituted of content number information NES (1 byte) which describes the number of contents that is the number of pieces of information on contents included in the contents group information CGIF. The content information ESI1 to ESIn specifically describe information indicating the attributes and so on of the contents.

Each piece of the content information ESI is constituted of auxiliary information RSV (1 byte) which is insignificant information of the content information ESI, content packet identification information CPD which includes type information CTY indicating a content type (that is, a type indicating whether a content is image information or sound information) and packet identification information PID for identifying the packet including the content, and type describing information CMD which specifically describes the identified type.

Referring to FIG. 5, the detailed configuration of the index information II will be described below.

As shown in FIG. 5, the index information II is constituted of index general information IGI which is general information of the index information II and pieces of index entry information IE1 to IEn which describe the start positions of a plurality of indexes on the hard disk 1.

The index general information IGI includes index number information NI (1 byte) which describes information indicating the number of indexes included in the program.

Each piece of index entry information IE is constituted of index description information IDC (100 bytes) including other information of the index, index representative image information IPRT (156 bytes) which concerns image information for a thumbnail image corresponding to the index, index start position information ISP which indicates the start position of a region on which a program included in a program list corresponding to the index is recorded on the hard disk 1, and index end position information IEP which indicates the end position of the region on which the program included in the program list corresponding to the index is recorded on the hard disk 1.

The index representative image information IPRT includes attribute information ITT (1 byte) indicating the attribute of the index representative image, auxiliary information RSV (3 bytes) which is insignificant information of the index representative image information IPRT, index representative image recording position information ITPS (8 bytes) which describes the recording position (the position of recording the start of information serving as the I picture) of image information corresponding to the index representative image on the hard disk 1 (in this case, only the I picture of recorded AV information corresponds to the image information) only when the thumbnail image specifier effective flag (described later) is effective, index representative image information amount information ITSZ (4 bytes) which describes an amount (the number of bytes) of image information corresponding to the index representative image only when the thumbnail image specifier effective flag (described later) is effective, name information ITP (128 bytes) describing the name of image information corresponding to the index representative image, offset position information IFT (4 bytes) describing the position of image information corresponding to the index representative image in the user definition thumbnail image information UDTN (to be specific, the number of offset bytes from the start of the user definition thumbnail image information UDTN), index representative image information amount information ILT (4 bytes) describing an amount (the number of bytes) of image information corresponding to the index representative image, horizontal information amount information ITH (2 bytes) which describes an amount of information in the horizontal direction of image information corresponding to the index representative image stored as a file, and vertical information amount information ITV (2 bytes) which describes an amount of information in the vertical direction of image information corresponding to the index representative image stored as a file.

To be specific, the index representative image recording position information ITPS and the index representative image information amount information ITSZ indicate the recording position and an amount of information of any one of static images included in the AV stream information AVD. Meanwhile, the name information ITP, the offset position information IFT, the index representative image information amount information ILT, the horizontal information amount information ITH, and the vertical information amount information ITV indicate static images which are recorded in the user definition thumbnail image information UDTN and are identified by name.

The attribute information ITT includes permission information REL indicating whether the reset of the index representative image should be permitted or not, a thumbnail image specifier effective flag VLD indicating whether the specification of a static image is effective or not, which uses the index representative image recording position information ITPS and the index representative image information amount information ITSZ, and attribute information ETFT indicating the type (attribute) of image information corresponding to an image used as the index representative image when the image is selected from image information other than distributed AV information. In this case, the permission information REL has a value "0" written to it when permitting the reset of the index representative image. When the reset is not permitted, the permission information REL has a value "1" written to it. The thumbnail image specifier effective flag VLD has a value "1" written to it when the specification of a static image is effective, which uses the index representative image recording position information PTPS and the index representative image information amount information ITSZ. When the specification is ineffective, the thumbnail image specifier effective flag VLD has a value "0" written to it.

Referring to FIG. 6, the following will describe the access unit information ACUI and the allocation unit information ALUI.

First, the access unit information ACUI is constituted of an access unit header ACUH serving as header information and name information ACIP1 to ACIPn (each having 128 bytes) describing the names of access unit information included in the access unit reference information ACUR.

The access unit header ACUH includes attribute information ACUT describing the attribute of access unit information and auxiliary information RSV (7 bytes) which is insignificant information of the access unit header ACUH.

The attribute information ACUT includes an access unit effective flag AVLD (1 bit) indicating whether recording or reproduction should be performed in each access unit, unit number information NACU (3 bits) which describes information indicating a total number of access units recorded on the hard disk 1, auxiliary information RSV (3 bits) which is insignificant information of the attribute information ACUT, and access unit handling information ACUM (1 bit) which describes information indicating how to handle the access unit. In this case, the access unit effective flag AVLD has a value "0" written to it when only time information on an allocation unit is recorded. When time information on an allocation unit and time information on an access unit are both recorded, the access unit effective flag AVLD has a value "1" written to it. Further, the access unit handling information ACUM has a value "0" written to it when the access unit is described in an access unit time stamp ACUTS (described later) by using display control time information (also referred to as a presentation time stamp) distributed in AV information. The access unit handling information ACUM has a value "1" written to it when the access unit time stamp ACUTS is described using arrival (reception) time of a packet distributed with the start of a corresponding access unit.

The allocation unit information ALUI is constituted of allocation unit general information ALGI which is general information of allocation unit information and pieces of allocation unit entry information ALE1 to ALEn describing time information on respective allocation units.

The allocation unit general information ALGI is constituted of allocation unit information amount information ALSZ (4 bytes) indicating the number of bytes of information included in one allocation unit, name information ADP (128 bytes) which describes information indicating the name of AV information included in the allocation unit, and unit number information NALU (4 bytes) which describes information indicating a total number of allocation units recorded on the hard disk 1.

Each piece of the allocation unit entry information ALE is constituted of start time stamp information SATS (4 bytes) which describes information indicating time when the first packet included in the corresponding allocation is received, and end time stamp information EATS (4 bytes) which describes information indicating time when the last packet included in the corresponding allocation is received.

Figure 7:
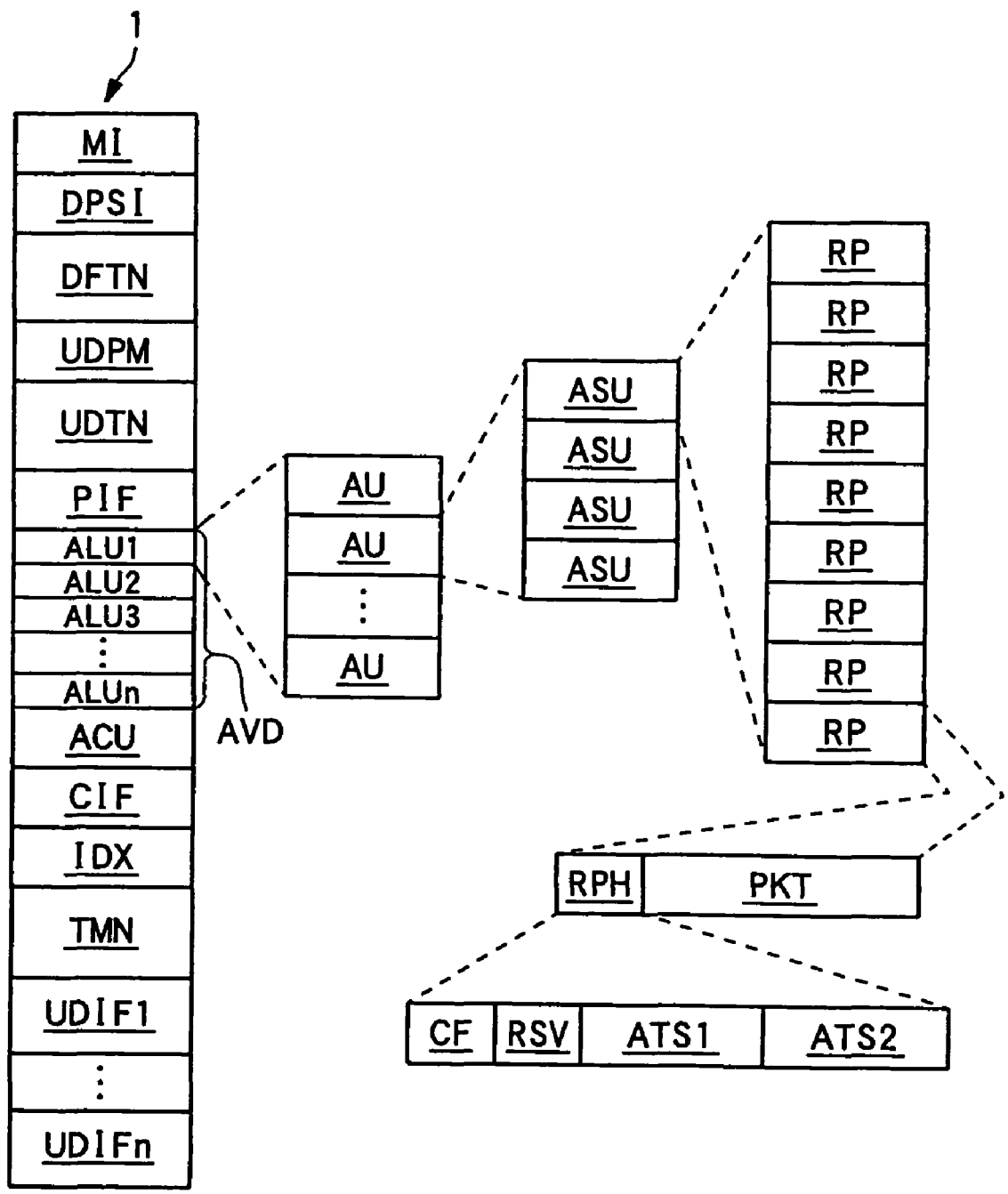
FIG. 7 is a diagram (VII) for explaining the recording format of the embodiment.

Referring to FIG. 7, the detailed configuration of the AV stream information AVD will be described below. FIG. 7 shows a recording format obtained by physically analyzing the AV stream information AVD.

First, as shown in FIG. 7, the AV stream information AVD has one or more allocation units ALU recorded on the hard disk 1 in an integrated manner. Each of the allocation units ALU has, for example, information of about 1 megabyte. Further, each of the allocation units ALU is constituted of one or more aligned units AU.

In this case, each of the aligned units AU is constituted of 12 sectors (one sector has 512 bytes) and is constituted of four aligned sub units ASU. Each of the sub aligned units ASU is constituted of eight recording packets RP. Each of the recording packets RP is obtained by adding a recording packet header RPH of 4 bytes to the front of a packet (including information of 188 bytes, which is a constant amount) PKT of the transport stream. The recording packet header RPH includes a flag CF (1 bit) which describes information indicating whether AV information distributed in the packet PKT is encrypted or not, auxiliary information RSV (2 bits) which is insignificant information of the recording packet header RPH, reception time information ATS1 indicating the reception time of the packet PKT clocked at 90 kHz, and reception time information ATS2 indicating the reception time of the packet PKT secondarily clocked at 27 MHz.

Finally, referring to FIG. 8, the detailed configuration of the access unit reference information ACUR will be described below.

Figure 8:
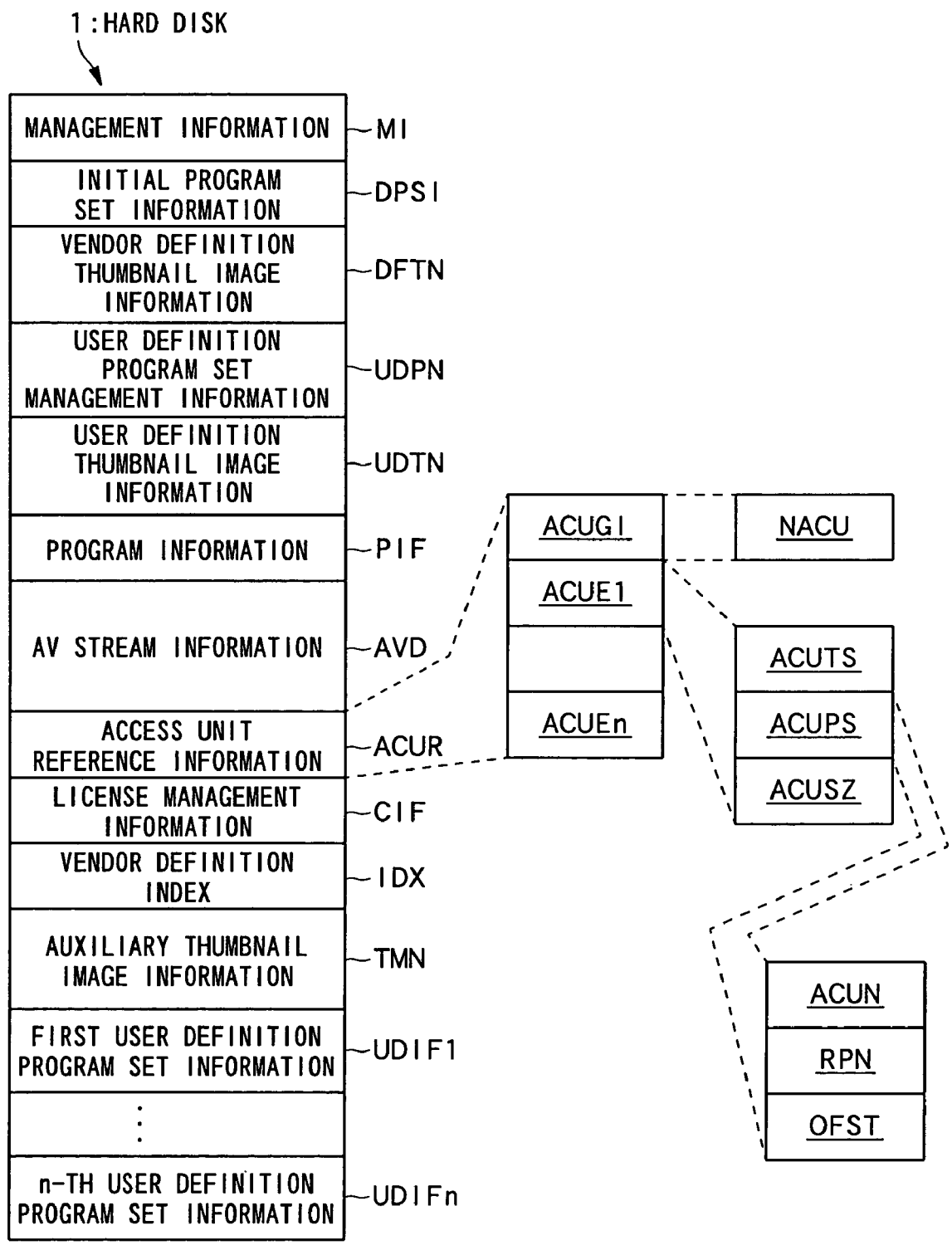
FIG. 8 is a diagram (VIII) for explaining the recording format of the embodiment.

As shown in FIG. 8, the access unit reference information ACUR is constituted of access unit general information ACUGI which is general information of the access unit reference information ACUR and pieces of access unit entry information ACUE1 to ACUEn which describe the recording positions of the plurality of access units on the hard disk 1.

The access unit general information ACUGI describes access unit number information NACU (4 bytes) indicating a total number of access units recorded on the hard disk 1.

Each piece of the access unit entry information ACUE includes an access unit time stamp ACUTS (4 bytes) describing time information on a corresponding access unit, access unit position information ACUPS indicating the recording position of the access unit on the hard disk 1, and access unit information amount information ACUSZ indicating an amount of AV information included in the access unit (in other words, an amount of information of the I picture corresponding to the access unit).

When the access unit time stamp ACUTS is described using display control time information distributed in AV information, the access unit handling information ACUM has a value "0" written to it. Meanwhile, when the access unit time stamp ACUTS is described using the arrival (reception) time of a packet distributed with the start of the corresponding access unit, the access unit handling information ACUM has a value "1" written to it.

The access unit position information ACUPS includes an access unit number ACUN which is a serial number of a corresponding access unit, a recording packet number RPN which is the number of a recording packet RP included in the access unit, and recording position information OFST which is address information indicating the recording position of the access unit on the hard disk 1. In this case, the recording packet number RPN is described as a serial number of the recording packet RP in one access unit. The recording position information OFST describes serial address information from the start position of the hard disk 1.

The above-described logical recording format enables recording and edit of the following embodiment.

(II) Embodiment of the Information Recording Apparatus

The following will describe the configuration and operations of the information recording apparatus which records and edits AV information based on the above-described recording format.

Figure 9:
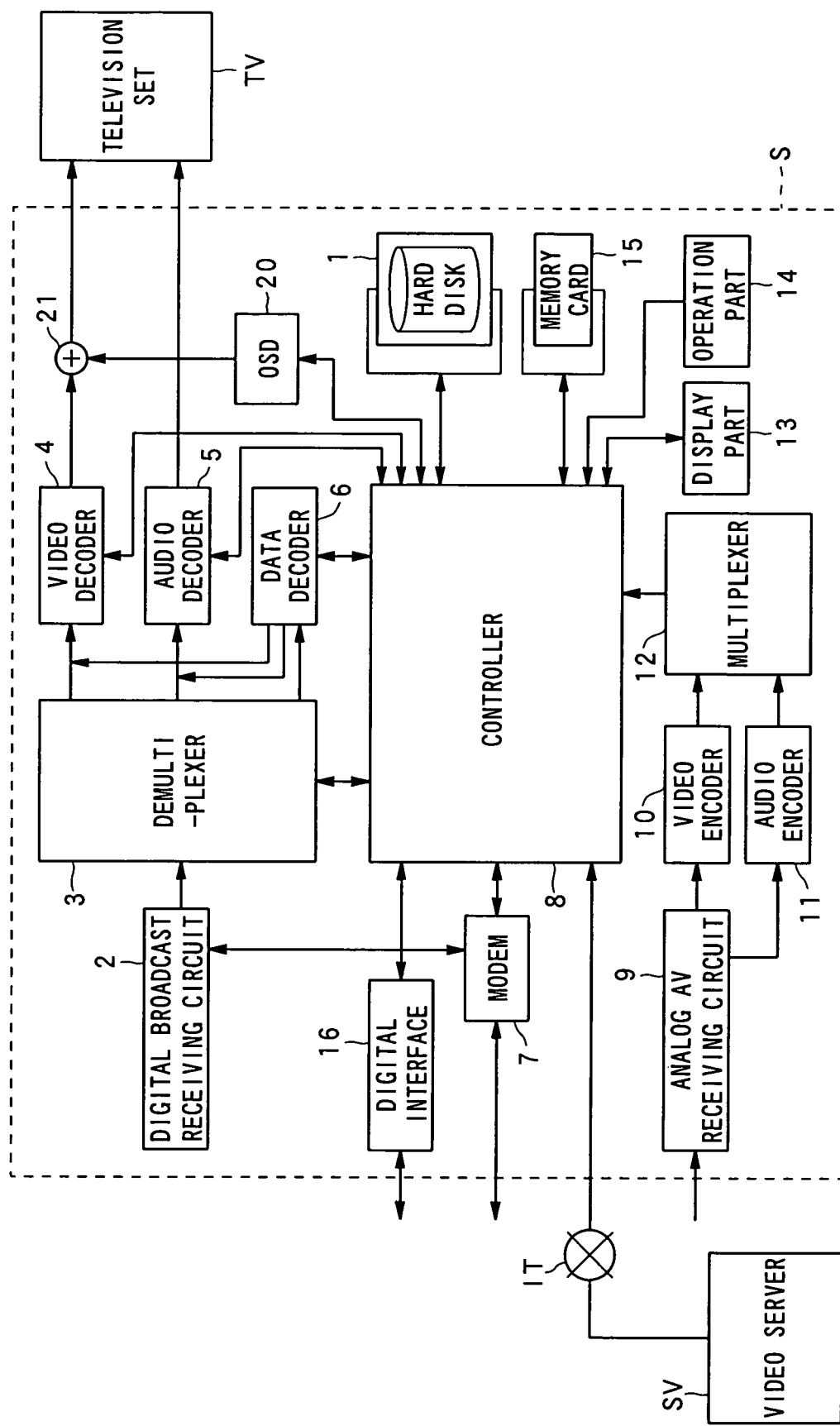
FIG. 9 is a block diagram showing the schematic configuration of an information recording apparatus according to the embodiment.

Referring to FIG. 9, the following will first describe the overall configuration and the outline of operations of the information recording apparatus.

As shown in FIG. 9, an information recording apparatus S of the present embodiment is directly connected to a television set TV serving as an external display device and is connected to an external video server SV via a network IT such as the Internet.

The information recording apparatus S is constituted of the hard disk 1 for recording AV information according to the recording format, a digital broadcast receiving circuit 2, a demultiplexer 3, a video decoder 4, an audio decoder 5, a data decoder 6, a modem 7, a controller 8 serving as a generating device and a recording device, an analog AV receiving circuit 9, a video encoder 10, an audio encoder 11, a multiplexer 12, a display part 13 serving as a display device, an operation part 14 serving as a selecting device, a memory card 15 which is a kind of a solid-state recording medium, a digital interface 16, an OSD 20, and an adding part 21.

The outlines of operations will be discussed below.

The video server SV generates, according to the format of the transport stream, AV information having been accumulated therein and distributes the AV information to the controller 8 in the information recording apparatus S via the network IT.

Analog terrestrial broadcasting, which is prevalent at present, is received by an analog AV receiving circuit via an antenna (not shown), and image information and sound information are separated from the received broadcasting. The image information is outputted to the video encoder 10 and the sound information is outputted to the audio encoder 11.

Then, the video encoder 10 encodes the image information in a digital manner and outputs the image information to the multiplexer 12.

Simultaneously, the audio encoder 11 encodes the sound information in a digital manner and outputs the sound information to the multiplexer 12.

With these operations, the multiplexer 12 alternately superimposes the digitized image information and sound information and outputs the information to the controller 8.

For example, AV information and so on distributed via a high speed serial network is received by the digital interface 16 and is outputted to the controller 8.

For example, the foregoing BS digital broadcasting and the like is received by the antenna (not shown), is decoded by the modem 7 operating under the control of the controller 8, and is outputted to the demultiplexer 3 via the digital broadcast receiving circuit 2.

Subsequently, under the control of the controller 8, the demultiplexer 3 separates image information, sound information, and data information (e.g., program information and the like for a computer corresponds to the data information) from AV information included in the inputted BS digital broadcasting. The image information, the sound information, and the data information are outputted respectively to the video decoder 4, the audio decoder 5, and the data decoder 6 and are separately decoded under the control of the controller 8. At this point, data information generated by decoding in the decoder 6 is superimposed on image information or sound information as necessary before being decoded.

Thereafter, the decoded image information and sound information are outputted for viewing as they are to the external television set TV.

At this point, the controller 8 exercises control over the series of processing operations, instructions and so on required for the control are provided by the user on the operation part 14, and an operation signal corresponding to the instruction is inputted from the operation part 14 to the controller 8, so that the controller 8 recognizes the contents of the instruction and performs necessary processing. Further, regarding an operating state and so on in the control, the corresponding display signal is generated by the OSD 20, the generated display signal is added to the output of the video decoder 4 as necessary by the adding part 21, and the result is displayed on the television set TV.

Additionally, the AV information to be accumulated in the hard disk 1 is decoded by the video decoder 4 or the audio decoder 5 and is outputted to the controller 8. Then, the controller 8 reconfigures the decoded image information and so on according to the recording formats and records the information on the hard disk 1.

Moreover, when AV information recorded on the hard disk 1 is edited, the AV information is read once from the hard disk 1 and is subjected to necessary edits based on operations of the operation part 14.

On the other hand, the memory card 15 accumulates the image information to be used as a thumbnail image, and the controller 8 duplicates the thumbnail image to the hard disk 1 and uses the image as the user definition thumbnail image.

The thumbnail image may be duplicated on the hard disk 1 via the digital interface 16 and a flexible disk drive and so on (not shown) as the user definition thumbnail image.

The following will describe the operations of the present embodiment in detail, particularly describe the generation and use of the program content information PESI.

In the following embodiment, AV information is broadcasted with various descriptors (e.g., known descriptors including a video component descriptor, a sound component descriptor, and a component group descriptor which are described later) by BS digital broadcasting and the AV information is recorded on the hard disk 1.

(A) Embodiment of Recording Process

First, referring to FIG. 10, the generation of the program content information PESI will be described below.

Figure 10:
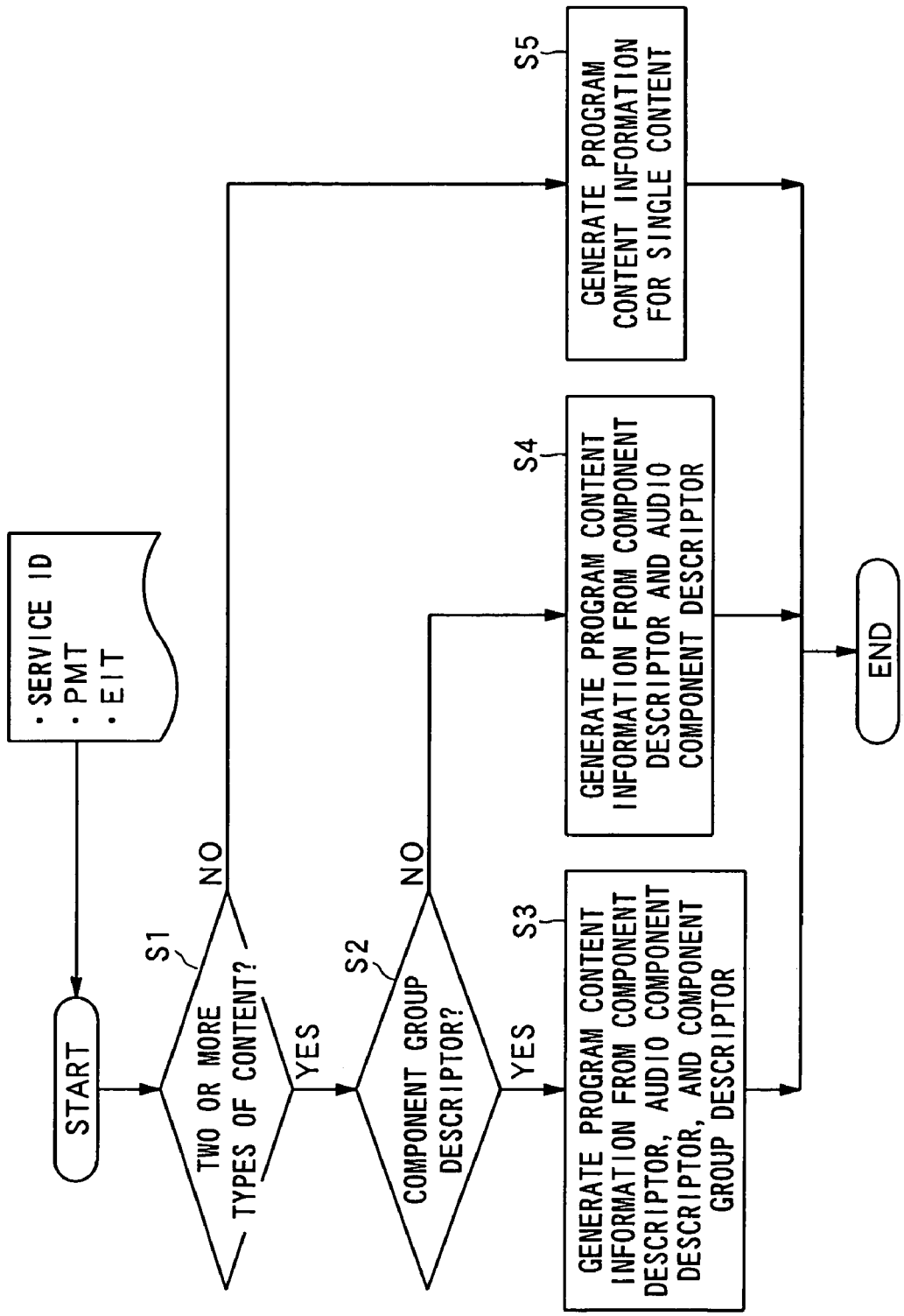
FIG. 10 is a flowchart showing the recording of the embodiment.

As shown in FIG. 10, in the recording of the present embodiment, it is assumed that a program management table and an event information table are selected based on service ID (Identification) information in BS digital broadcasting, the service ID having been selected for receiving broadcasting, and the tables are inputted to the controller 8.

Based on the assumption, when the recording of AV information is started, it is first confirmed whether the selected program management table has two or more types of contents (step S1). When two or more types of contents are not present (step S1; NO), the content packet identification information CPD for identifying a content of broadcasting to be received is acquired based on the program management table and the program content information PESI is generated (step S5).

When it is decided in step S1 that the selected program management table has two or more types of contents (step S1; YES), it is then confirmed whether the selected event information table includes the component group descriptor (step S2).

Subsequently, when the component group descriptor is included (step S2; YES), a component tag indicating the relationship between the content packet identification information CPD and contents is generated and set based on the component descriptor, the audio component descriptor, and so on. Further, information about a set of correlating contents is obtained based on the component group descriptor and the program content information PESI is generated (step S3).

When it is decided in step S2 that the component group descriptor is not included (step S2; NO), a component tag indicating the relationship between the content packet identification information and contents is generated and set based on the component descriptor, the audio component descriptor, and so on. Further, information about a set of correlating contents is obtained and the program content information PESI is generated (step S4).

In parallel with the generation of the program content information PESI, the received broadcasting is sequentially recorded on the hard disk 1. When an instruction to stop the recording is received, management information including the program content information PESI generated by the flowchart is recorded the hard disk 1 and thus the recording is completed.

(B) Embodiment of Reproduction Process

Figure 11:
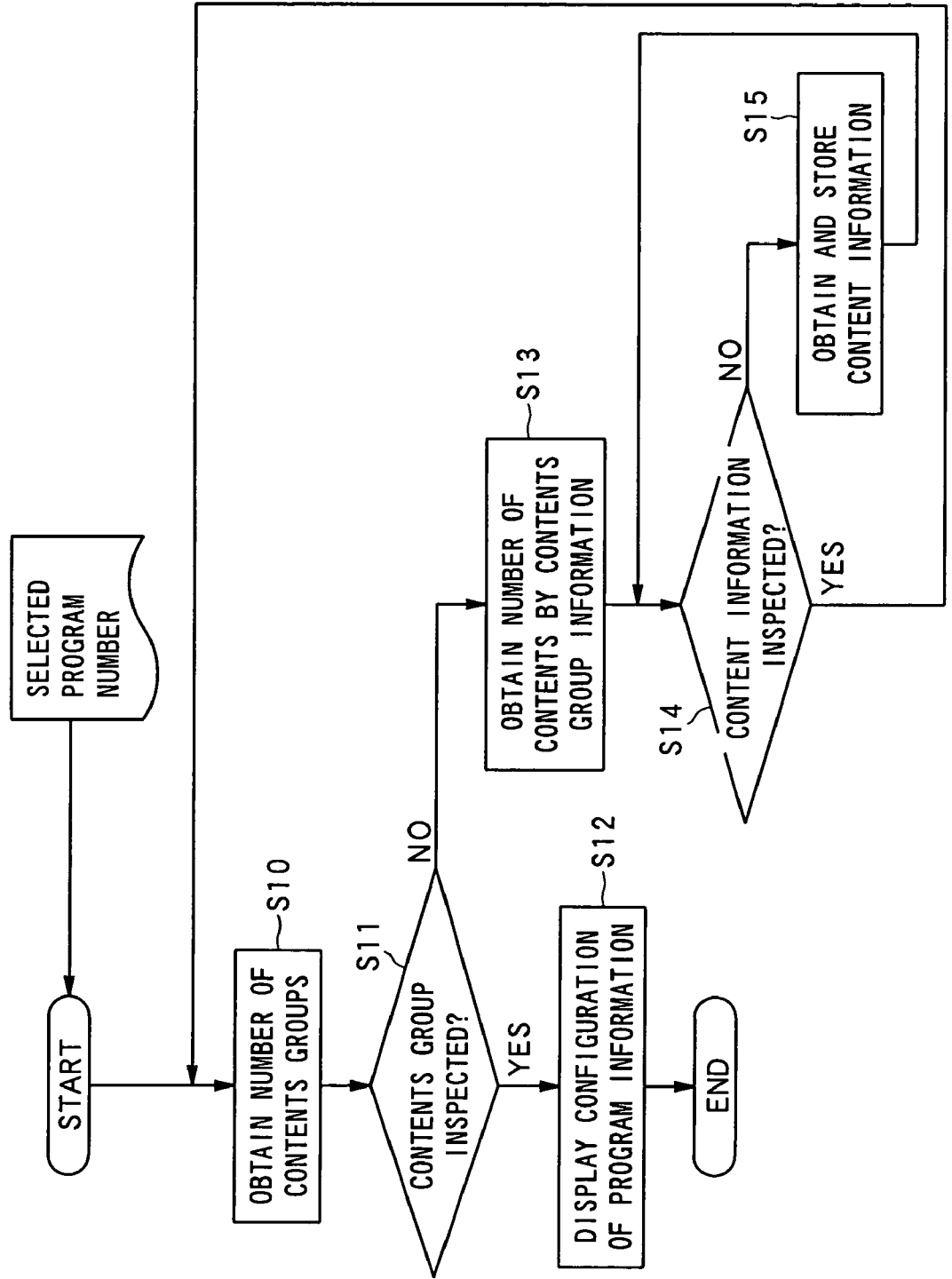
FIG. 11 is a flowchart showing the reproduction of the embodiment.
Figure 12:
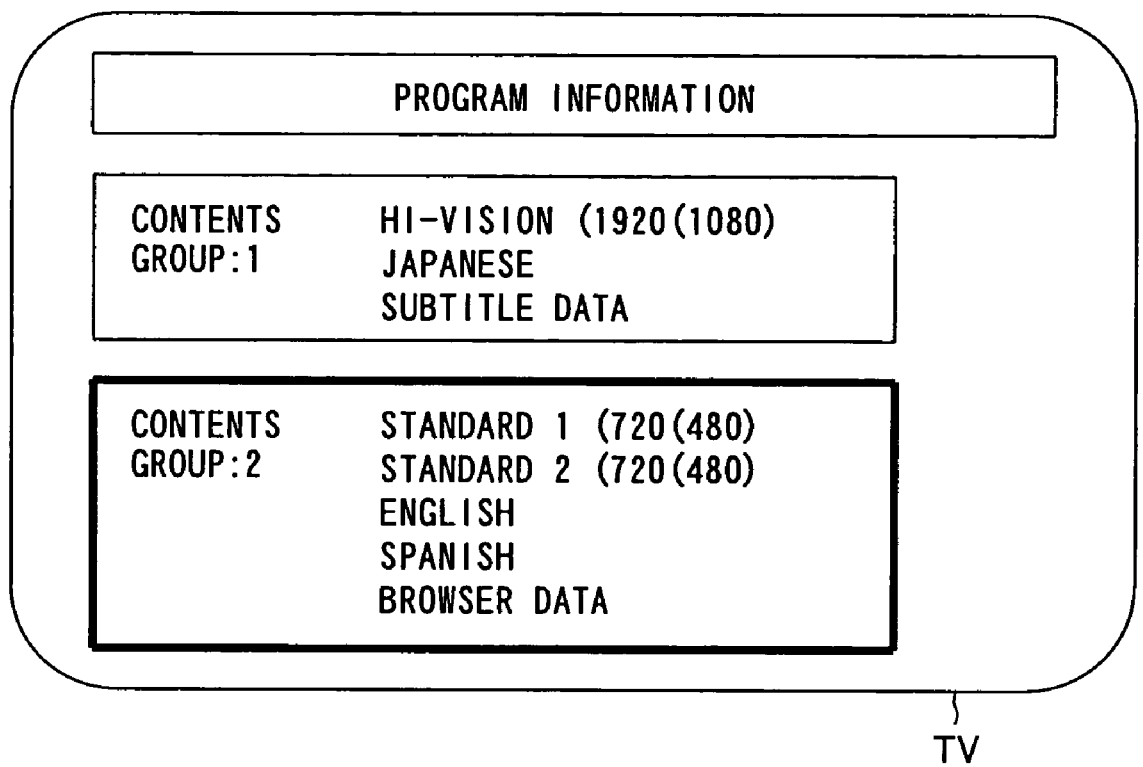
FIG. 12 is a diagram showing a display example of the reproduction of the embodiment.

Referring to FIGS. 11 and 12, the following will describe reproduction of AV information which has been recorded with the program content information PESI in the foregoing recording.

FIG. 11 is a flowchart for displaying program information, which is displayed before the reproduction. FIG. 12 shows a display example of the television set TV or the display part 13 in display processing. As shown in FIG. 11, in the reproduction of the present embodiment, it is assumed that a program to be reproduced is selected beforehand by number.

Based on the assumption, when the reproduction is started, the program information PIF is first referred which corresponds to a selected program, and the number of contents groups is acquired based on the pointer number information SPN included in the program information PIF (step S10).

Then, it is confirmed whether the contents of all the acquired contents groups have been confirmed or not (step S11). When the confirmation is completed, the display of information on the program is configured and then the information is displayed (step S12).

At this point, for example, the contents are displayed on the television set TV or the display part 13 for each of the contents groups as shown in FIG. 12.

When it is decided in step S11 that all the contents groups are not confirmed (step S11; NO), the corresponding contents group information CGIF is searched and the number of contents is acquired based on the content number information NES included in the contents group information CGIF (step S13).

Subsequently it is confirmed whether the contents of all the acquired contents have been confirmed or not (step S14). When the confirmation is completed (step S14, YES), the process returns to step S10 and the same processing is performed on the subsequent contents group.

When it is decided in step S14 that the contents of all the acquired contents are not confirmed (step S14; NO), the content information ESI on an unconfirmed content is selected and stored in a memory (not shown, step S15). The process returns to step S14 and the above processing is repeated.

When the processing is completed, the AV information recorded on the hard disk 1 is sequentially reproduced.

As described above, according to the operations of the information recording apparatus S of the present embodiment, the content packet identification information CPD, the type describing information CMD, and the contents group information CGIF are recorded separately from AV information. Thus, when the AV information is reproduced, it is possible to recognize the combination and so on of contents included in the AV information without the need for reproducing the AV information itself.

Further, the content packet identification information CPD, the type describing information CMD, and the contents group information CGIF are generated based on the descriptors included in the AV information broadcasted by BS digital broadcasting, thereby correctly generating the information with ease.

The present invention is not limited to the foregoing embodiments and various modifications can be made.

First, in the embodiments, a video signal and soon are obtained by receiving radio waves of ordinary analog terrestrial TV broadcasting or radio waves of digital satellite broadcasting such as BS digital broadcasting. Additionally, for example, a video signal and so on can be obtained from server VOD (video on demand) via the Internet and a private line.

In the embodiments, the hard disk 1 is used as a recording medium. Various recording mediums such as a DVD and a flash memory, which can rewrite information, are also applicable.

Moreover, a program corresponding to the flowcharts of FIGS. 10 and 11 is recorded on an information recording medium including a flexible disk or a hard disk. Alternatively the program is obtained via a network such as the Internet and is recorded. The program is read and exercised by a general-purpose microcomputer and so on. Thus, the microcomputer can be caused to act as the controller 8 of the embodiments.

The invention claimed is:

1. An information recording apparatus for recording broadcasting information on a recording medium, the broadcasting information includes one or more contents, types of the contents are different from each other, and is constituted of unit information which has a predetermined amount of information and correlation information which indicates a correlation between the contents, the apparatus comprising:

a generating device for generating a plurality of contents group information based on the correlation information, each of the contents group information including identification information for identifying a relationship between the unit information and the content and type information indicating a type of the content, the contents group information (i) being a part of management information, (ii) indicating a contents group including the contents and (iii) indicating, for a respective contents group, one or more combinations of the contents which are able to be reproduced, and a recording device for recording the generated contents group information on the recording medium with the broadcasting information, wherein the recording device records the management information on the recording medium separately from the broadcasting information, and wherein only contents which are able to be reproduced are included in a display.

2. The information recording apparatus according to claim 1, wherein the broadcasting information is broadcasted by BS digital broadcasting, and the correlation information is a descriptor broadcasted by BS digital broadcasting.

3. An information reproducing apparatus for reproducing the broadcasting information from the recording medium on which the contents group information is recorded with the broadcasting information by the information recording apparatus of claim 1 or 2, the reproducing apparatus comprising:

a selecting device which selects a content to be reproduced before the broadcasting information is reproduced, and a generating device which generates a display signal for displaying contents of the contents group information corresponding to the contents group including the selected content.

4. An information recording method for recording broadcasting information on a recording medium, the broadcasting information includes one or more contents, types of the contents are different from each other, and is constituted of unit information which has a predetermined amount of information and correlation information which indicates a correlation between the contents, the method comprising:

a generating process of generating a plurality of contents group information based on the correlation information, each of the contents group information including identification information for identifying a relationship between the unit information and the content and type information indicating a type of the content, the contents group information (i) being a part of management information, (ii) indicating a contents group including the contents and (iii) indicating, for a respective contents group, one or more combinations of the contents which are able to be reproduced, and a recording process of recording the generated contents group information on the recording medium with the broadcasting information, wherein the recording process records the management information on the recording medium separately from the broadcasting information, and wherein only contents which are able to be reproduced are included in a display.

5. The information recording method according to claim 4, wherein the broadcasting information is broadcasted by BS digital broadcasting, and the correlation information is a descriptor broadcasted by BS digital broadcasting.

6. An information reproducing method for reproducing the broadcasting information from the recording medium on which the contents group information is recorded with the broadcasting information by the information recording method of claim 4 or 5, the reproducing method comprising:

a selecting process of selecting a content to be reproduced before the broadcasting information is reproduced, and a generating process of generating a display signal for displaying contents of the contents group information corresponding to the contents group including the selected content.

7. A non-transitory medium storing an information recording program for causing a recording computer to function as a generating device and a recording device, the recording computer being included in an information recording apparatus for recording broadcasting information on a recording medium, the broadcasting information includes one or more contents, types of the contents are different from each other, and is constituted of unit information which has a predetermined amount of information and correlation information which indicates a correlation between the contents, the generating device for generating a plurality of contents group information based on the correlation information, each of the contents group information including identification information for identifying a relationship between the unit information and the content and type information indicating a type of the content, the contents group information (i) being a part of management information, (ii) indicating a contents group including the contents and (iii) indicating, for a respective contents group, one or more combinations of the contents which are able to be reproduced, the recording device for recording the generated contents group information on the recording medium with the broadcasting information, wherein the recording device records the management information on the recording medium separately from the broadcasting information, and wherein only contents which are able to be reproduced are included in a display.

8. The information recording program according to claim 7, wherein the broadcasting information is broadcasted by BS digital broadcasting, and the correlation information is a descriptor broadcasted by BS digital broadcasting.

9. A non-transitory medium storing an information reproducing program for causing a reproducing computer to function as a selecting device and a generating device, the reproducing computer being included in an information reproducing apparatus for reproducing broadcasting information from a recording medium on which contents group information is recorded with the broadcasting information by the information recording apparatus of claim 1 or 2, the selecting device selecting a content to be reproduced before the broadcasting information is reproduced, the generating device generating a display signal for displaying contents of the contents group information cor responding to a contents group including the selected content.

10. An information recording medium, wherein the information recording program of claim 7 or 8 is recorded so as to be read by a recording computer.

11. An information recording medium, wherein the information reproducing program according to claim 9 is recorded so as to be read by a reproducing computer.

* * * * *